Jan. 30, 1968 P. HINI ET AL 3,366,909

CONTACT-FREE ELECTRICAL SIGNAL DEVICE

Filed Oct. 24, 1965 3 Sheets-Sheet 1

3,366,909
CONTACT-FREE ELECTRICAL SIGNAL DEVICE
Paul Hini, Erlangen, and Herbert Weiss, Nuremberg, Germany, assignors to Siemens-Schuckertwerke Aktiengesellschaft, Berlin and Erlangen, Germany, a corporation of Germany
Filed Oct. 24, 1965, Ser. No. 504,704
Claims priority, application Germany, May 31, 1965, S 97,384
11 Claims. (Cl. 338—32)

ABSTRACT OF THE DISCLOSURE

A contact-free electrical signal device comprises a magnetic circuit having a stationary magnetically excited portion defining an air gap therein, a soft magnetic material portion disposed in the air gap and peripherally spaced from the stationary portion and adapted to be freely rotatable within said air gap about an axis of rotation, at least one galvanomagnetic semi-conductor field plate means being disposed in the space defined by the stationary and rotatable portions of the magnetic circuit. The semiconductor field plate means comprises two galvanomagnetic semiconductor resistance components having respective base resistances of different magnitudes, the rotatable portion of the magnetic circuit being a circular disclike member comprising at least one circular segment disc sector which is either coaxially or radially displaced from at least one other circular segment disc sector, the sectors alternately defining the periphery of the circular disclike member and being rotatable along adjacent circular paths during a rotational cycle of circular disclike member. The resistance components are adjacently disposed in the field plate means alongside the circular paths respectively whereby during a rotational cycle of the disclike member the respective resistance components are alternately traversed by a magnetic field.

Our invention relates to electrical signal devices. More particularly, it relates to contact-free electrical signal devices which embody galvanomagnetic semiconductor field plates.

It is, at present, known to dispose galvanomagnetic semiconductor field plates in the air gap defined by opposing pole shoes of a magnet and to thereby produce contact-free resistors resulting from the galvanomagnetic resistance characteristics of the aforementioned field plates. By changing the magnetic field relative to the field plate so disposed in an air gap or by varying the size of the portion of the field plate disposed in the air gap, variable resistors or potentiometers are provided. The electrical resistance of a galvanomagnetic semiconductor field plate attains a maximum, suitably designated $R_B$, when all of the field plate is entirely disposed within the magnetic field of the magnetic circuit, or at the maximum point strength of the magnetic field. By progressively removing the field plate from the air gap, i.e., the magnetic field, its resistance may be correspondingly reduced and at the point where it is completely outside of the magnetic field, its resistance $R_0$ is at a minimum, i.e., at a base level.

It is quite evident that the variable resistance characteristic of the galvanomagnetic semiconductor field plate can be suitably utilized for many control functions in electrical circuits and circuit components. Thus, for example, the operation of a transistor can be controlled with the aid of a galvanomagnetic semiconductor field plate. In this latter connection, such field plate can be inserted in the base to emitter circuit or the base to collector circuit of the transistor.

To enable practical exploitation of such galvanomagnetic semiconductor field plates as signal devices, there has to be availed of the effects resulting from the resistance ratio $R_B/R_0$, the salient requirement being that such ratio be made sufficiently large. It is obvious that as a large a ratio as desired can be achieved by providing a commensurately large magnetic field to which a field plate is subjected. However, the need for simplicity is a limiting factor and, to meet the requirements of simplicity, there are generally employed permanent magnets to provide the magnetic circuits in which the field plates are respectively disposed. With such use of permanent magnets, the increasing of the maximum to minimum resistance ratio quite soon encounters substantially unsurmountable problems.

Accordingly, it is an important object of this invention to provide a simple arrangement embodying galvanomagnetic semiconductor field plates wherein the maximum to minimum resistance ratio $R_B/R_0$ can be increased to desirable and practicable values.

This object is achieved by providing a contact-free electrical signal device in which at least one galvanomagnetic semiconductor field plate is disposed in the air gap defined by a stationary and a rotatable component of a magnetic circuit. According to the invention, the semiconductor field plate comprises two resistor components whose respective resistances differ from each other in their orders of magnitude, and the rotatable component of the magnetic circuit is comprised of a soft magnetic, i.e., high-permeability, material yoke which comprises coaxially displaced circular disc sectors, whereby during rotation of the yoke, both resistor components are alternately traversed by the magnetic field.

In a feature according to the invention, the galvanomagnetic semiconductor field plate may be a tandem field plate with its two resistor components arranged adjacent to each other, the base resistance, i.e. $R_0$ of one of the resistor components being quite large relative to the base resistance of the other resistor component.

In another feature according to the invention, the two resistor components of the field plate are connected as a voltage divider in the base electrode input circuit of a transistor. In such arrangement, the resistor component having the lower value base resistance $R_O$ is located in the base to emitter circuit of the transistor and the collector to base voltage, i.e., the output voltage of the transistor is applied across a load resistance.

According to the invention and as required and/or desired, the magnetic structures providing the magnetic field may comprise two or more pole shoes, a galvanomagnetic semiconductor field plate being mounted on each of the pole shoes respectively. With this arrangement, each field plate may be connected as a voltage divider in the base electrode input circuit of a transistor.

The advantages presented by this invention can be readily appreciated. Thus, with the employment of semiconductor field plates comprising two resistor components, particularly tandem field plates, for a given magnetic field, essentially improved circuit values are obtained. This is because both resistor components of a field plate are alternately subjected to the magnetic field whereby there results not only the resistance ratio $R_B/R_0$ of an individual resistor but the square of the ratio $R_B/R_0$.

Furthermore, because of the shape chosen for the rotatable yoke, the magnetic field is constantly concentrated on a resistor component and, consequently, only a relatively weak magnetic excitation of the magnetic circuit is required to obtain a practically usable circuit value. However, if strong magnetic fields should be employed, values of 1000 and more may be obtained for the product of the resistance ratios $R_B/R_0$. Such high values may even be achieved using good permanent magnets, permanent magnets being the preferred magnetic excitation sources in the simplest embodiments of the signal device constructed according to the invention.

A particular advantage of the signal device made according to the invention lies in the fact that the steepness of the waveform of the signal output may be adjusted, such adjustment particularly being effected by the selection of the configuration of the air gap and the pole shoes. In addition, because in the rotational cycle of the yoke, a magnetic field is continuously present for one or the other resistor components of the field plate, the signal waveform produced has no sharp corners (inconsistencies), i.e., the slope of the circuit is always finite. Therefore, the signals produced by the signal device are relatively free of upper harmonics as compared to known signal devices. No sparks are produced and no radio frequency interference can occur.

Signal devices constructed in accordance with the principles of the invention may conveniently be classified as comprising first and second groups. The devices which fall into the first group are those wherein the axis of rotation of the yoke lies approximately perpendicularly to the direction of the magnetic lines of force in the air gap. In this first group, the circular disc sectors comprising the yoke are disposed on the axis of rotation adjacent each other.

The signal devices which fall into the second group are those in which the axis of rotation of the yoke lies approximately parallel to the direction of the magnetic lines of force in the air gap. In this group, the circular disc sectors lie in one plane and the opposing surfaces of the pole shoes of the magnetic circuit lie substantially parallel to each other, the opposing surfaces of the pole shoes facing the air gap.

In an illustrative embodiment of a signal device constructed in accordance with the principles of the invention and falling into the first group, the angular length of one sector of the yoke may be from 120° to 180°. Thereby, the pole shoes are so configured and arranged with respect to each other that, at least in one rotational position of the yoke, the magnetic flux between the pole shoes traverses only the aforesaid one sector. The yoke is also shown as a control disc hereinbelow. Generally, the width or thickness of the peripheral edge of the yoke, i.e., its dimension measured along the axis of rotation direction corresponds to the length of the resistor components of a tandem galvanomagnetic semiconductor field plate located in the air gap, the lengths of the resistor components also being measured along the direction of the axis of rotation.

The signal device, according to the invention, may, for example, be employed for digital angle measuring. In such application, the yoke comprises equicircumferential sectors and the circumferential range of each sector is as long as the tandem field plate across which the signal is produced.

The signal device may also be advantageously employed as an interrupter for the ignition system of internal combustion engines, particularly since it is, inherently, free from radio frequency interference. In this application, the circumferential length of one of the disc sectors is generally chosen to correspond approximately to the width of the tandem field plate.

If two or more tandem galvanomagnetic semiconductor field plates are disposed in the air gap, i.e., subjected to the magnetic field in the magnetic circuit, then the signal device may be utilized to great advantage as a contact-free switching head for a direct current motor, replacing the commutator used therefor.

The circular disc sectors, are, preferably, at least, statically balanced relative to the axis of rotation. However, in certain applications such as, for example, where rotational velocities exceeding 15,000 revolutions per minute are required, it may also be of advantage to dynamically balance the circular disc sectors. The latter may be effected by completing the magnetic material circular disc segment to a complete circular disc with non-magnetic material. The non-magnetic material used in such case may be an alloy material having the same thickness as the soft magnetic material of the magnetic disc sector. Suitably alloys utilizable in this connection are alloys of copper and aluminum, or of tin, lead, zinc.

Generally speaking and in accordance with the invention, there is provided a contact-free electrical signal device comprising a magnetic circuit comprising a stationary magnetically excited portion defining an air gap therein and a soft magnetic material portion disposed in the air gap and peripherally spaced from the stationary portion and adapted to be freely rotatable about an axis of rotation within the air gap. There is further included at least one galvanomagnetic semiconductor field plate means disposed in the space defined by the stationary and rotatable portions of the magnetic circuit. The semiconductor field plate means comprises two galvanomagnetic semiconductor resistance components having respective base resistances of different magnitudes. The rotatable portion of the magnetic circuit is a circular disclike member with two circular segment disc sectors which are coaxially displaced with respect to each other, the resistance components being adjacently disposed in the field plate means whereby during a rotational cycle of the member, the respective resistance components are alternately traversed by the magnetic field, the resistance components being adapted to be connected in electrical circuit.

The foregoing and more specific objects of our invention will be apparent from and will be mentioned in the following description of a contact-free electrical signal device according to the invention taken in conjunction with the accompanying drawing:

In the drawing, FIG. 1 is an elevational view of an illustrative embodiment of a first group type device constructed in accordance with the principles of the invention;

Figure 1:
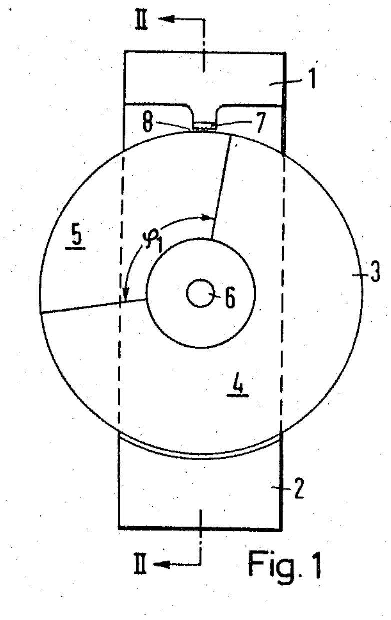
Figure 2:
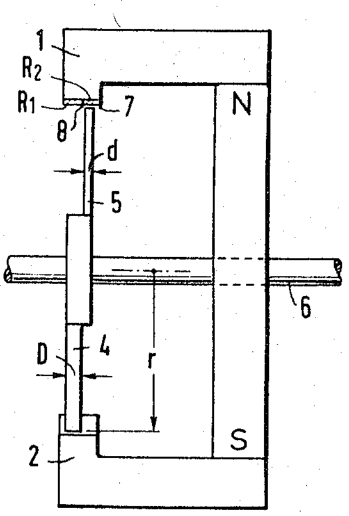
FIG. 2 is a view of the device shown in FIG. 1 taken from the aspect of lines II—II in FIG. 1 looking in the direction of the arrows.

Referring now to FIGS. 1 and 2 wherein there is shown an illustrative embodiment of a contact-free signal device constructed in accordance with the principles of the invention, the pole shoes 1 and 2 of the magnetic circuit are substantially symmetrically disposed relative to an axially disposed rod 6 which is adapted to be rotatable on the axis of rotation. Disposed between pole shoes 1 and 2 is a rotatable yoke 3 comprising a soft magnetic material, yoke 3 suitably being designated a control disc, the disc comprising two disc sectors 4 and 5. In the air gap 8 between control disc 3 and pole shoe 1 and mounted on an extension of pole shoe 1 is a galvanomagnetic semiconductor field plate 7, the aspect of FIG. 1 showing the shorter dimension or width of the field plate. As seen in FIG. 2 wherein the length dimension of field plate 7 is shown and which lies substantially parallel to the axis of rotation, field plate 7 comprises two resistor components $R_1$ and $R_2$ disposed in adjoining relationship.

It is seen in FIG. 1 that pole shoe 2 has an air gap opposing face which is concentric with control disc 3 and which is substantially wider than the air gap opposing face of pole shoe 1 upon which field plate 7 is mounted and may oppose as much as one-fourth the circumference of control disc 3. Because the air gap opposing and field plate mounting face of pole shoe 1 is chosen to be quite narrow, there is enabled the achieving of a concentration of the magnetic flux in the region of field plate 7 on the latter plate. As seen in FIG. 2, the thickness D of disc sector 4 may be greater than the thickness $d$ of disc sector 5, the respective thickness of these sectors being selected in accordance with the active lengths of the respective resistor components comprising the field plate. It is also seen in FIG. 2 that sector S is disposed coplanarly with resistor component $R_2$ and sector 4 is disposed coplanarly with resistor component $R_1$ of field plate 7.

Figure 3:
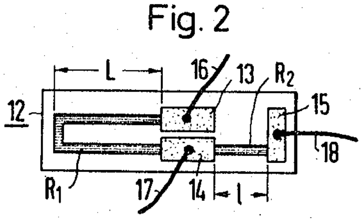
FIG. 3 is a plain view of galvanomagnetic semiconductor field plate means suitable for use in the device in FIGS. 1 and 2.

In FIG. 3, there is shown an embodiment of a semiconductor field plate suitable for use as field plate 7 in the signal device shown in FIGS. 1 and 2. It is seen that the field plate shown in FIG. 3 is a tandem field plate. Resistor component $R_1$ has terminal electrical contacts 13 and 14 to which there are connected lead wires 16 and 17 for connecting resistor component $R_1$ in an electrical circuit. Resistor component $R_2$ has a terminal electrical contact 15 to which there is connected lead wire 18. Both of resistor components $R_1$ and $R_2$ are mounted on a base plate 12 which may suitably comprise a ferromagnetic material or ferrite.

In a design application of the signal device shown in FIGS. 1 and 2 and employing a semiconductor field plate as shown in FIG. 3, the magnetic excitation for the magnetic circuit can be provided by a permanent magnet N–S which may be about 18 mm. in length. About 7 kilogauss are obtained in air gap 8. The radius $r$ of control disc 3 may be about 5 mm., thickness D of sector 4 may be about 2.5 mm., and thickness $d$ of sector 5 may be about 1.5 mm. The angle $\varphi$, may be selected, depending upon the use to which the signal device is applied, to be between a value in which the circumferential length of sector 5 is about equal to the length of the field plate and 180°. The material of which control disc 3 is comprised, is of a high-permeability, i.e., soft magnetic type.

A design example of the field plate as shown in FIG. 3 may be one in which the active length L of resistor components $R_1$ is about 1.6 mm. and in which the active length 1 of resistor component $R_2$ is about 0.6 mm. The lengths of center contacts 16 and 17 measured in the same direction as are measured lengths L and 1 may be about 1.9 mm. The overall dimensions of this design example of the galvanomagnetic semiconductor field plate shown in FIG. 3 may be about 4 x 1.5 mm. The resistor component $R_1$ in this example has a base resistance value $R_O$ (i.e., when it is not subjected to a magnetic field) of about 500 ohms and resistor component $R_2$ has a base resistance $R_O$ of about 20 to 50 ohms.

Figure 4:
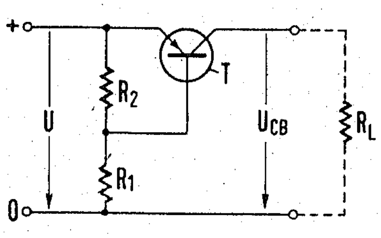
FIG. 4 is a circuit wherein the field plate means in a signal device such as shown in FIGS. 1 and 2 may be advantageously utilized.

An example of a circuit application of the field plate shown in FIG. 3 is schematically depicted in FIG. 4. In this circuit the input voltage U may have a value, for example, of between about 6 to 14 volts. The smaller resistor component, $R_2$ of the field plate is inserted in the emitter to base circuit of a transistor T, which may suitably be a switching transistor. The output voltage $U_{CB}$ is applied across a load resistance $R_L$. Such load resistance may be, for example, the exciting winding of a direct current motor.

Figure 5:
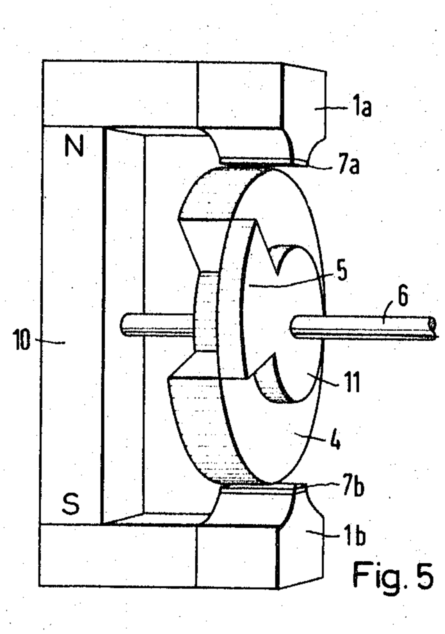
FIG. 5 is a three-dimensional view of a signal device similar to that shown in FIGS. 1 and 2 and including two galvanomagnetic semiconductor field plate means.

FIG. 5 is a three-dimensional depiction of an example of a signal device falling into the hereinabove mentioned first group. The device comprises a magnetic circuit which is magnetically excited by a permanent magnet (N–S) 10, the legs of the magnet terminating in soft magnetic material pole shoes $1a$ and $1b$, the opposing pole shoes being tapered as is pole shoe 1 in the signal device of FIGS. 1 and 2. Galvanomagnetic semiconductor field plates $7a$ and $7b$ are provided on the opposing faces of pole shoes $1a$ and $1b$ respectively. The yoke or control disc comprises a thicker sector 4 and a thinner sector 5 mounted on a rod member 6 which is disposed on the axis of rotation and is adapted to be rotated thereabout. It is seen in the embodiment of FIG. 5 that the radius of the axis portion 11 of the control disc is proportionately so large that it effects a magnetic connection 11 between disc sectors 4 and 5. The radius of the widened expanded axis 11 may be, for example, half as long as the radius of the control disc sectors.

Both of the field plates $7a$ and $7b$, similar to the field plates in the preceding described figures, may be respectively connected as voltage dividers in the base input circuits of transistors.

Figure 6:
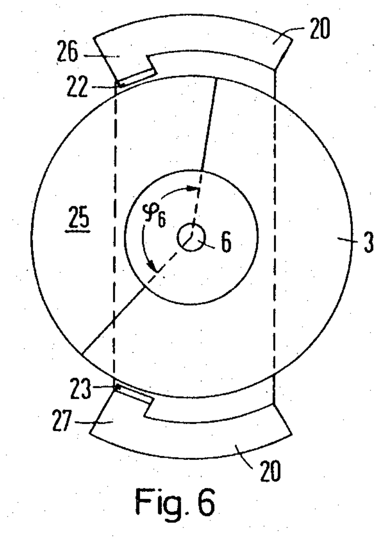
FIGS. 6, 7, 8 are views of further embodiments of the aforementioned first group type device constructed in accordance with the principles of the invention.

In FIG. 6 there is shown a signal device falling into the hereinabove set forth first group in which two field plates 22 and 23 are provided on pole shoes 26 and 27 respectively. The circular disc sector 25 of the yoke or control disc 3 has a circumference determined by the angle $\varphi 6$, the latter angle exceeding 120°. The circumferential length of sector 25 is so chosen whereby both of field plates 22 and 23 can be spanned thereby. Pole shoes 26 as 27 are excited by a magnetic circuit 20 and control disc 3 is mounted on rod 6 which is disposed on the axis of rotation and is adapted to be rotated therearound.

Figure 9:
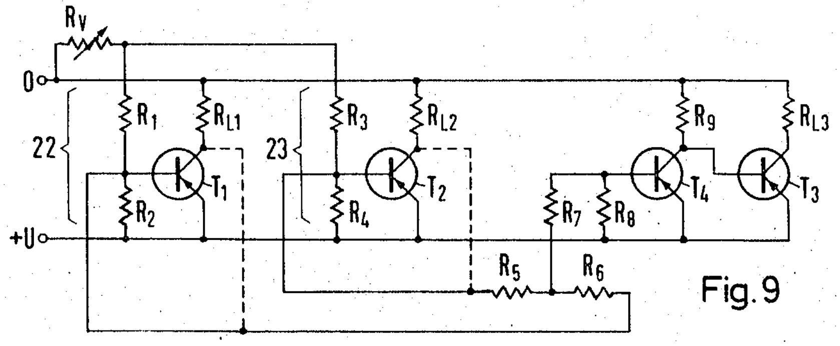
FIG. 9 is an electrical circuit wherein there is advantageously employed the signal device shown in FIG. 6.

The two field plates 22 and 23, as shown in FIG. 6, may be connected independently in transistor input circuits as shown in FIG. 9. Referring to FIG. 9, the voltage divider comprising resistors $R_1$ and $R_2$ in the input circuit to transistor $T_1$ may be the resistor components of field plate 22, this voltage divider operating to control transistor $T_1$ the output voltage thereof being developed across load resistance $R_{L1}$. The resistors $R_3$ and $R_4$ which are the resistor components of field plate 23 are connected in the input of a transistor $T_2$ to control it whereby, the output of transistor $T_2$ being developed across a load resistance $R_{L2}$.

It has been advantageous in the circuit of FIG. 9 to provide a variable resistance $R_V$ which is connected from common to field plate resistors $R_1$ and $R_2$ respectively. Thereby the tolerances of the signal device according to the invention may be balanced out. In addition, with the aid of resistance $R_V$, the ratios $R_B/R_0$ of the respective field plates and thereby the operational effect of the signal device may be varied, i.e., adjusted to optimal operating conditions.

In considering the operation of the circuit of FIG. 9, with both of transistors $T_1$ and $T_2$ non-conductive, a transistor $T_3$ is to supply load current to a load resistance $R_{L3}$ and with either of transistors $T_1$ and $T_2$ conductive, transistor $T_3$ is to be non-conductive. To effect such operation a NAND gate is connected between transistor $T_3$ and transistors $T_1$ and $T_2$. The NAND gate comprises the resistors $R_5$, $R_6$ $R_7$ and $R_8$ and effects the rendering conductive of a transistor $T_4$ only if one of transistors $T_1$ and $T_2$ is also conductive. The load resistance in the ouput of transistor $T_4$ is designated with the notation, $Rg$. When transistor $T_4$ is conductive, transistor $T_3$ is non-conductive. If transistors $T_1$ and $T_2$ are both non-conductive, then transistor $T_4$ is also non-conductive and, consequently, transistor $T_3$ is conductive.

In the event that load resistances $R_{L1}$ and $R_{L2}$ in the circuit of FIG. 9 are purely ohmic resistors, then the addition circuit comprises resistors $R_5$ and $R_6$ may be alternatively connected to the collectors of $T_1$ and $T_2$ respectively, as shown by the dashed lines, through the appropriate closed positions of S, and $S_2$ respectively. However, in the event that all of the three load impedances, viz $R_{L1}$, $R_{L2}$ and $R_{L3}$ in the circuit of FIG. 9 are inductive loads such as the field winding, i.e., the exciting winding, of a motor, displaced phase relations may occur. In this situation, it is of advantage to connect resistors $R_5$ and $R_6$ to the center electrodes of both tandem field plates 22 ($R_1$, $R_2$) and 23 ($R_3$ and $R_4$) as is shown in FIG. 9.

Figure 7:
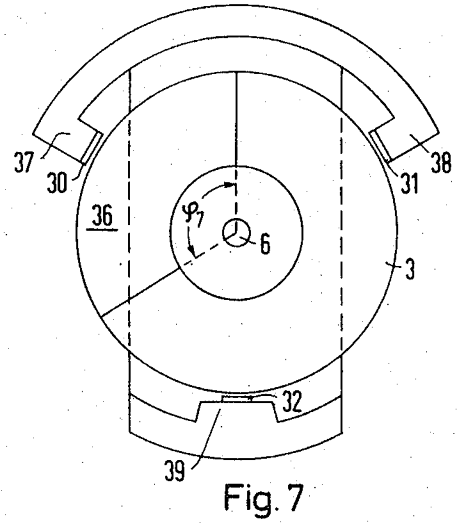

The signal device shown in FIG. 6 used in a circuit such as shown in FIG. 9 wherein two galvanomagnetic semiconductor field plates are provided, produces the same effect as a signal device which has three field plates, as shown in FIG. 7.

In FIG. 7, the three field plates 30, 31 and 32 are angularly displaced from each other 120° and the base inputs of respective transistors are connected directly to each field plate in an arrangement as is shown in FIG. 4. The signal device shown in FIG. 6, as utilized in the circuit of FIG. 9, presents the advantage that one less field plate is required therein than is required in the signal device shown in FIG. 7. However, in the use of a signal device such as shown in FIG. 6 in the circuit of FIG. 9, a relatively complicated circuit is required with the need for the additional transistor $T_4$ and additional resistors $R_5$, $R_6$, $R_7$ and $R_8$.

The circular disc sector 36 in the signal device of FIG. 7 should have a circumferential length which is larger than 120° of a circle by approximately the width of two field plates. Then, at given rotation positions of control disc 3, the same corresponding type of resistor components of two field plates may simultaneously be subjected to the strong magnetic field in the air gap of the magnetic circuit. If the field plates are connected into the field, i.e., the exciting, windings of direct current motors, there may be obtained with the control disc design shown in FIG. 7, advantageous starting conditions. In this connection, in the case of signal devices according to FIG. 7, it has been found to be advantageous for angle $\varphi 7$ to be from about 125 to 140° for circular disc sectors 36.

In the signal device according to FIG. 7, care has to be taken to insure that the magnetic flux through the pole shoe 39 having galvanomagnetic semiconductor field plate 32 thereon, is divided and that half of this flux flows back into the magnetic circuit, for example, a permanent magnet, through pole shoe 37 having field plate 30 thereon and pole shoe 38 having field plate 31 thereon. In order to create equal circuit conditions for all of the three field plates 30, 31 and 32 respectively, it is accordingly necessary to make pole shoe 39 about twice as large as pole shoes 37 and 38. If the air gap opposing, i.e., the front surfaces of pole shoes 37 and 38 are equal in area to the area of their field plates 30 and 31 respectively and, if all of field plates 30, 31 and 32 are of equal surface area, then the area of the front face of pole shoes 39 must be about twice the area of field plate 32 which is positioned thereon.

Figure 8:
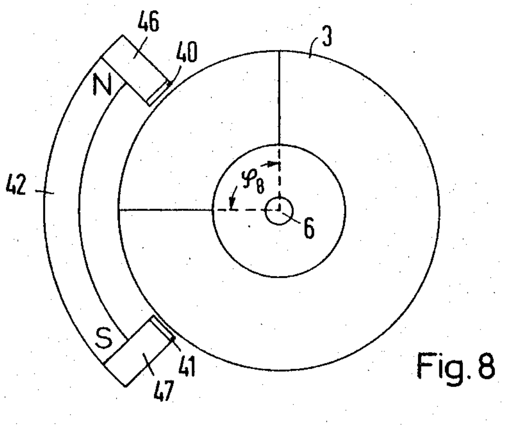

FIG. 8 shows another embodiment of a single device according to the invention comprising two field plates in which the magnetic circuit comprising the N–S permanent magnet 42 is disposed laterally with respect to control disc 3 rather than being symmetrically disposed behind disc 3. In this embodiment, field plates 40 and 41 are located on the air gap opposing faces of pole shoes 46 and 47 respectively. The use of either of the devices of FIGS. 8 and 6 is a choice determined essentially by space factors.

Instead of providing three pole shoes as are shown in the signal device depicted in FIG. 7, a device may be made according to the invention comprising four pole shoes. Such arrangement would result, for example, if a permanent magnet 42, as shown in FIG. 8 at the left, were also disposed at the right of control disc 3. Also, a signal device according to FIG. 7 could readily be redesigned into one having four pole shoes. To this end, it would only be necessary to divide pole shoe 39 into two pole shoes, each having a field plate thereon. In a device comprising four pole shoes, the vertex angle $\varphi$ determining the circumference of one circular disc sector would, for example, be 90°.

An appropriate control disc sector with an angle $\varphi 8$ equal to 90° is shown in FIG. 8. As has been stated hereinabove, the described signal devices may be used in the place of commutators to control direct current motors.

Another application for the signal devices according to the invention is as an interrupter in a contact-free ignition system for internal combustion engines. In such application, it is preferable to select the angle for determining circumferential length o fthe disc sector to be quite small since in ignition systems, a short pulse has to be supplied to the transistors and their associated circuit components.

Digital angle measurement may be performed with a single field plate in a signal device according to FIGS. 1 to 3 and a circuit according to FIG. 4. However, for such measurement, it is advantageous to divide the entire circumference of the control disc into many sectors of a small circumferential or angular width. The widths may be chosen to be so small whereby a circumference of a sector is as long as the width of the field plate according to FIG. 3.

Figures 10, 12, 13:
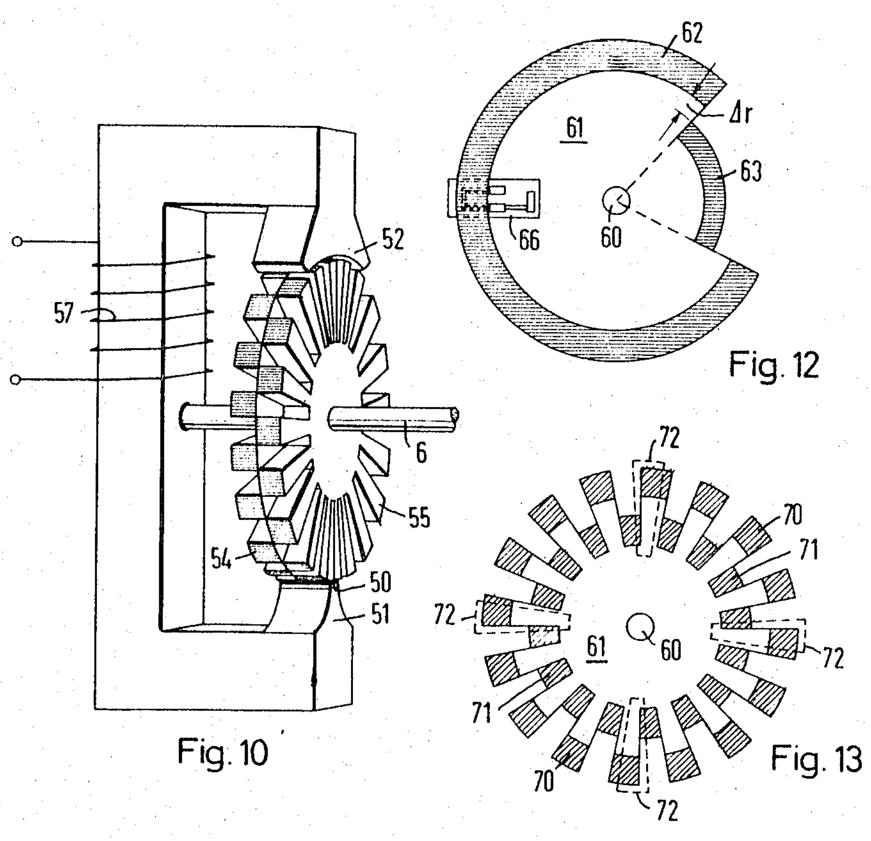
FIG. 10 is a three-dimensional view of a first-group embodiment suitable for digital angle measurement, this figure showing a suitable control disc for such purpose.
FIG. 12 is a view of the device shown in FIG. 11 taken from the aspect of lines XII—XII of FIG. 11 looking in the direction of the arrows.
FIG. 13 shows a control disc to be used in a device such as depicted in FIGS. 11 and 12 for enabling such device to be employed for digital measurement.

Such type of multi-sectored control disc is three-dimensionally depicted in FIG. 10. The embodiment shown in FIG. 10 relates to a signal device of the hereinabove described first group. The control disc in FIG. 10 is subdivided into a multiplicity of radially disposed spaced teeth 54 and a like multiplicity of radially disposed spaced teeth 55, the spaces between adjacent teeth being equal to the width of the teeth, the teeth 54 being respectively positioned between the teeth 55 in alternating arrangement. A pole shoe 52 is provided whose air gap opposing face is concentric with the control disc and which spans a portion of the circumference of the disc, similar to pole shoe 2 in the signal device shown in FIG. 1. In addition, a tapered pole shoe 51, similar to tapered pole shoe 1 in the device of FIG. 1, is provided, pole shoe 51 carrying the field plate 50. The control disc is mounted on axially disposed rod 6 which is adapted to be rotated. The signal device shown in FIG. 10 may comprise a magnetic circuit excited by a permanent magnet as are the magnetic circuits of the embodiments herein described or by electromagnetic means utilizing a coil 57 for example.

The space between the respective teeth of the control disc in the device of FIG. 10, as previously mentioned hereinabove, is chosen for application to the width of the tandem field plate which is to be affected thereby. In a design example, the angular circumferential distance between adjacent teeth on the control disc may be about 0.1 mm. Thus, if the control disc is chosen to have, for example, a radius of about 100 mm., then the resulting teeth pairs 54, 55 together number far more than 3000.

Figure 11:
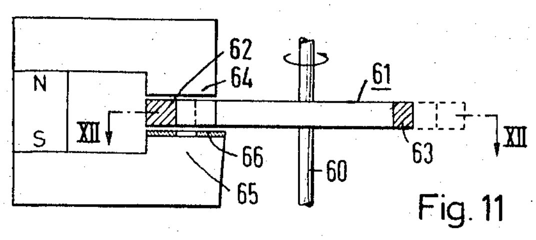
FIG. 11 is a view of an illustrative embodiment of a second group type device constructed in accordance with the principles of the invention.

In FIGS. 11 and 12 wherein an embodiment of a signal device of the hereinabove described second group is shown in two different aspects, the axis of rotation of control disc 61 along which rotatable rod 60 is disposed is parallel to the magnetic field lines of force in the air gap between pole shoes 64 and 65. The air gap opposing faces of pole shoes 64 and 65 lie parallel to each other and a field plate 66 is provided on pole shoe 55, field plate 66 suitably being designed approximately similarly to the field plate shown in FIG. 3. The magnetic circuit in the device, as shown in FIG. 11, may be excited by a permanent magnet N–S. The control disc, which is shown in the plan view in FIG. 12, comprises two circular disc sectors 62 and 63 which, as all of the other control discs described so far, comprise a soft, i.e., high permeability, magnetic material and are also depicted as circular ring sectors in the depicted embodiment. In accordance with the distance of the active parts of the resistor components $R_1$ and $R_2$ as shown in FIG. 3, both sectors 62 and 63 in the device of FIG. 12 have a radial distance $\Delta r$ therebetween. Such distance between the disc sectors may, of course, also be utilized in the embodiment examples according to the preceding figures. In a practical embodiment of the signal devices of the second group, according to the invention, it has been found usually to be advantageous to also place the control disc, i.e., disc 61 in FIG. 11, at the periphery in order to take up magnetic reaction forces.

In the device according to FIGS. 11 and 12, two or more pole shoes may be employed, particularly where the device is to be used in a computer circuit. The range of applications of the devices of the second group are substantially identical with those of the devices of the first group. The advantageous selection of any of the devices for a particular application may, for example, be determined by space factors.

FIG. 13 shows an embodiment of a control disc, in accordance with the invention and in accordance with the embodiment shown in FIGS. 11 and 12, which is particularly suitable for digital angle measurement. The control disc 61 in FIG. 13 comprises two circular arrays of radially disposed space teeth 70 and 71 corresponding to the toothed control disc shown in FIG. 10. In a device of the second group, four pole shoe pairs 72, shown in dashed line outlines, may be used for example. Just as in the embodiment shown in FIG. 10, the device shown in FIG. 13 may also have more than two arrays of teeth in a control disc. Consequently, field plates with more than two resistor components adjacent to each other may then be used, the number of resistor components corresponding to the number of teeth arrays.

It will be obvious to those skilled in the art upon studying this disclosure that contact-free electrical signal devices according to our invention permit of a great variety of modifications and hence can be given embodiments other than those particularly illustrated herein without departing from the essential features of our invention and within the scope of the claims annexed hereto.

We claim:

1. A contact-free electrical signal device comprising a magnetic circuit comprising a stationary magnetically excited portion defining an air gap therein, a soft magnetic material portion disposed in said air gap and peripherally spaced from said stationary portion and adapted to be freely rotatable about an axis of rotation and within said air gap, at least one galvanomagnetic semiconductor field plate means disposed in the space defined by said stationary and rotatable portions of said magnetic circuit, said semiconductor field plate means comprising two galvanomagnetic semiconductor resistance components having respective base resistances of different magnitudes, said rotatable portion of said magnetic circuit being a circular disclike member comprising at least one circular segment disc sector coaxially displaced from at least one other circular segment disc sector, said sectors alternately defining the periphery of said circular disclike member and being rotatable along adjacent circular paths during a rotational cycle of said circular disclike member, said resistance components being adjacently disposed in said field plate means alongside said circular paths respectively, whereby during a rotational cycle of said member, said respective resistance components are alternately traversed by a magnetic field.

2. A contact-free electrical signal device as defined in claim wherein said field plate is tandem field plate on which said resistance components are disposed adjacent each other and in which the base resistance value of one component resistor is greater than that of the other component resistor.

3. A contact-free electrical signal device as defined in claim 1 wherein said stationary portion comprises a magnetic circuit exciting magnet, a pair of pole shoes extending from opposite ends of said magnet in the same direction and substantially in parallel, the opposing faces of said pole shoes defining said air gap, each of said opposing faces having a galvanomagnetic semiconductor field plate thereon, each of said field plate having said two resistance components.

4. A contact-free electrical signal device as defined in claim 3 wherein the direction of the magnetic field in said air gap is substantially perpendicular to said axis of rotation, said disc sectors being disposed on said axis of rotation coaxially displaced from each other.

5. A contact-free electrical signal device as defined in claim 4 wherein one of said disc sectors has an arcuate length determined by a vertex angle of 120° to 180°.

6. A contact-free electrical signal device as defined in claim 5 wherein said one disc sector has a thickness less than the other of said disc sectors, wherein the respective greater of said resistance components on said field plates oppose the periphery of said other of said disc sectors and wherein the respective smaller of said resistance components oppose said one of said disc sectors.

7. A contact-free electrical signal device as defined in claim 1 wherein said stationary portion comprises a magnet for magnetically exciting said magnetic circuit, said magnet comprising three pole shoes having respective faces angularly displaced from each other 120° concentric with and opposing said disclike member, a tandem galvanomagnetic semiconductor field plate on each of said faces, each of said field plates having a pair of resistance components therein in adjacent relationship adapted to be connected in series arrangement in an electrical circuit, two of said pole shoes having the same magnetic polarity, the faces of said last-named two pole shoes having about half the area of the other of said three pole shoes, whereby the magnetic flux traversing said other pole shoe is about twice as great as that of the flux traversing each of said two pole shoes, a vertex angle of one of said circular disc sectors being between 120 and 140°.

8. A contact-free electrical signal device as defined in claim 1 wherein said stationary portion comprises a magnet for magnetically exciting said magnetic circuit, said magnet comprising four pole shoes having respective faces angularly displaced from each other 90°, concentric with, and opposing said disclike member, a tandem galvanomagnetic semiconductor field plate on each of said faces, each of said field plates having a pair of resistance components thereon in adjacent relationship adapted to be connected in series arrangement in an electrical circuit, pairs of said pole shoes having the same magnetic polarity, the vertex angle of one of said disc sectors being 90°.

9. A contact-free electrical signal device as defined in claim 1 wherein said axis of rotation lies substantially parallel to the direction of the magnetic flux in said air gap.

10. A contact-free electrical signal device comprising a magnetic circuit having a stationary magnetically excited portion defining an air gap therein, a soft magnetic material portion disposed in said air gap and peripherally spaced from said stationary portion and adapted to be freely rotatable about an axis of rotation and within said air gap, at least one galvanomagnetic semiconductor field plate means disposed in the space defined by said stationary and rotatable portions of said magnetic circuit, said semiconductor field plate means comprising two galvanomagnetic semiconductor resistance components having respective base resistances of different magnitudes, said rotatable portion on said magnetic circuit being a circular disclike member comprising at least one circular segment disc sector radially displaced from at least one other circular segment disc sector, said sectors alternately defining the periphery of said circular disclike member and being rotatable along adjacent circular paths during a rotational cycle of said circular disclike member, said resistance components being adjacently disposed in said field plate means alongside said circular paths respectively, whereby during a rotational cycle of said member, said respective resistance components are alternately traversed by a magnetic field.

11. A contact-free electrical signal device comprising a magnetic circuit having a stationary magnetically excited portion defining an air gap therein, a soft magnetic material portion disposed in said air gap and peripherally spaced from said stationary portion and adapted to be freely rotatable about an axis of rotation and within said air gap, at least one galvanomagnetic semiconductor field plate means disposed in the space defined by said stationary and rotatable portions of said magnetic circuit, said semiconductor field plate means comprising two galvanomagnetic semiconductor resistance components having respective base resistances of different magnitudes located adjacent one another on said field plate means, said rotatable portion of said magnetic circuit being a circular disclike member comprising two circular segment disc sectors coaxially displaced from one another and having a periphery variable at different angular positions on the axis of rotation thereof, said two resistance components being traversible by said two segment disc sectors respectively at different angular positions thereof whereby during a rotational cycle of said disclike member, said respective resistance components are alternately traversed by a magnetic field, said stationary portion comprising a magnetic circuit exciting magnet, a pair of pole shoes extending from opposite ends of said magnet in the same direction and substantially in parallel, the opposing faces of said pole shoes defining said air gap, each of said opposing faces having a galvanomagnetic semiconductor field plate thereon and each of said field plates having said resistance components, the direction of the magnetic field in said air gap being substantially perpendicular to said axis of rotation, and said disc sectors being disposed on said axis of rotation coaxially displaced from each other.

References Cited

UNITED STATES PATENTS

| | | | |
|---|---|---|---|
| 2,924,633 | 2/1960 | Sichling et al. | 338—32 |
| 2,108,662 | 2/1938 | Fischer | 310—1-68 |
| 3,112,464 | 11/1963 | Ratajski et al. | 338—32 |
| 3,139,600 | 6/1964 | Rasmanis et al. | 338—32 |
| 3,152,261 | 10/1964 | Carlstein | 324—45 |
| 3,162,804 | 12/1964 | Parsons | 338—32 |
| 3,266,003 | 8/1966 | Nieda | 338—32 |
| 3,267,404 | 8/1966 | Hieronymus | 338—32 |

RICHARD M. WOOD, *Primary Examiner.*

W. D. BROOKS. *Assistant Examiner.*